C. & F. HALSTEAD
Stewing-Kettle.
No. 211,845.  Patented Feb. 4, 1879.
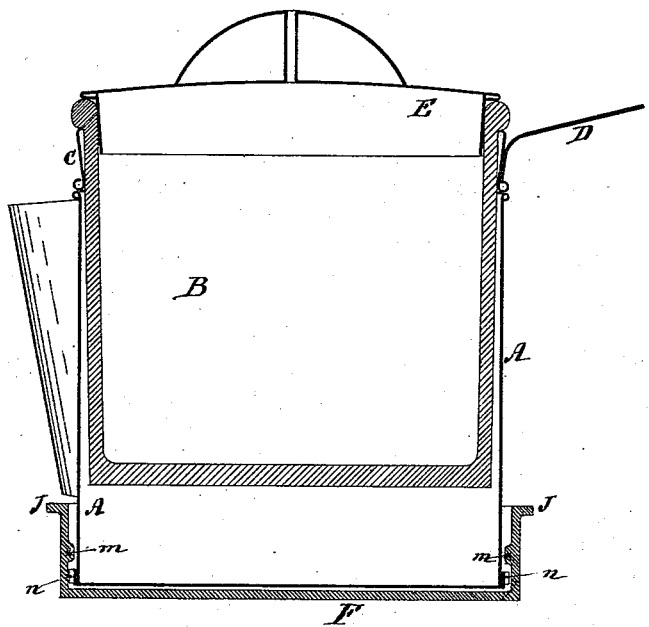
Witnesses.
Inventors.
Charles & Francis Halstead
per Weery & Roeder
Attorney.

UNITED STATES PATENT OFFICE.

CHARLES HALSTEAD AND FRANCIS HALSTEAD, OF BROOKLYN, N. Y.

IMPROVEMENT IN STEWING-KETTLES.

Specification forming part of Letters Patent No. 211,845, dated February 4, 1879; application filed August 5, 1878.

*To all whom it may concern:*

Be it known that we, CHARLES HALSTEAD and FRANCIS HALSTEAD, both of the city of Brooklyn, in the State of New York, have invented a new and useful Improvement in Stewing-Kettles, of which the following is a specification:

The nature of our invention consists in the combination of an exterior kettle provided with a false detachable bottom, capable of being placed upon or into the opening of a stove to accelerate the boiling of the fluid in the inner kettle, and preventing the bottom of the exterior kettle from becoming damaged or soiled by contact with the stove or fire, and of an interior kettle made of china or earthenware, provided with a suitable band for its support and a suitable handle to facilitate the emptying of the same.

In the accompanying drawing, which represents a longitudinal section of a stewing-kettle embodying our invention, A is the outer kettle, generally made of tin, to contain the water to be boiled, and into which the stewing-kettle B is placed. On the bottom of this kettle A one or more projections, $n$, are made.

F represents the false or detachable bottom, made of heavier material, generally of cast-iron or wrought-iron, provided with a surrounding flange, J, to support the same on the edge of the opening when placed into the hole of the stove or range, and having an internal rib or projection, $m$, with suitable openings for the projections $n$ on the bottom of the kettle A to pass below or through the same. The kettle being placed into this bottom F so that its projections $n$ come below the rib $m$, the partial turning around of the kettle or false bottom will attach the same together through this rib $m$ resting upon the projections $n$.

The inner kettle, B, we make of china or earthenware, to prevent the substances to be stewed from coming in contact with metal, which often imparts an unpleasant flavor. On the upper part of this kettle B a band, C, is attached, for the purpose of giving the desired support upon the top of the outer kettle, A, and at the same time, by increasing or diminishing the size of the lower part of this band, to allow the space between the two kettles, which contains water, to be increased or diminished. To this band C a handle, D, is firmly attached, to facilitate pouring out of the substance from this kettle.

We are aware that the inside of this inner kettle has been painted and covered or lined with a composition of porcelain; but all these linings wear off in time, when the substance will be brought in contact with the metal of which the body of this kettle is made.

What we claim as our invention, and desire to secure by Letters Patent, is—

A stewing-kettle consisting of an exterior kettle, A, provided with a false detachable bottom, F, and an interior kettle, B, made of china or its equivalent, and provided with a band, C, and handle D, the whole arranged and combined in the manner and for the purpose substantially as specified.

CHARLES HALSTEAD.
FRANCIS HALSTEAD.

Witnesses:
J. B. NONES,
HENRY E. ROEDER.